United States Patent [19]
Tamaki et al.

[11] Patent Number: 5,698,341
[45] Date of Patent: Dec. 16, 1997

[54] CARBON MATERIAL FOR LITHIUM SECONDARY BATTERY AND PROCESS FOR PRODUCING THE SAME

[75] Inventors: Toshio Tamaki; Yoshiyuki Nishimura, both of Kamisu-machi, Japan

[73] Assignee: Petoca, Ltd., Tokyo, Japan

[21] Appl. No.: 695,848

[22] Filed: Aug. 9, 1996

[30] Foreign Application Priority Data

Aug. 18, 1995 [JP] Japan .................. 7-232071
Aug. 18, 1995 [JP] Japan .................. 7-232072

[51] Int. Cl.⁶ .................................. H01M 4/62
[52] U.S. Cl. ............... 429/218; 429/232; 423/275; 423/449.2; 423/448
[58] Field of Search ............... 423/275, 445 R, 423/447.2, 447.6, 448; 429/218, 232

[56] References Cited

U.S. PATENT DOCUMENTS

| | | | |
|---|---|---|---|
| 2,734,801 | 2/1956 | Brooks | 423/448 |
| 4,197,279 | 4/1980 | Saito et al. | 423/275 X |
| 4,574,077 | 3/1986 | Uemura et al. | 423/447.2 X |
| 4,948,574 | 8/1990 | Sasaki et al. | 423/447.2 X |
| 5,356,574 | 10/1994 | Tamaki et al. | 264/29.2 |
| 5,498,493 | 3/1996 | Dann et al. | 429/218 |
| 5,556,723 | 9/1996 | Ohsaki et al. | 429/218 |

FOREIGN PATENT DOCUMENTS

| | | |
|---|---|---|
| 0 629 012 | 12/1994 | European Pat. Off. |
| 0 644 603 | 3/1995 | European Pat. Off. |
| 47-50331 | 12/1972 | Japan |
| 48-9801 | 3/1973 | Japan |
| 7-73898 | 3/1995 | Japan |

OTHER PUBLICATIONS

Database WPI, Derwent Publications, AN-91-365343, JP-A-03 245 458, Nov. 1, 1991.
Database WPI, Derwent Publications, AN-95-188589, JP-A-07 105 955, Apr. 21, 1995.
Patent Abstracts of Japan, JP-A-7 105936 Apr. 12, 1995.
Patent Abstracts of Japan, JP-A-8 31422, Feb. 2, 1996.
Patent Abstracts of Japan, JP-A-2 49095, Feb. 19, 1990.
Patent Abstracts of Japan, JP-A-2 145814, Jun. 5, 1990.
Patent Abstracts of Japan, JP-A-3 245458, Nov. 1, 1991.
Patent Abstracts of Japan, JP-A-5 251080, Sep. 28, 1993.
Patent Abstracts of Japan, JP-A-6 168725, Jun. 14, 1994.
Patent Abstracts of Japan, JP-A-6 333601, Dec. 2, 1994.

*Primary Examiner*—Stephen Kalafut
*Attorney, Agent, or Firm*—Oblon, Spivak, McClelland, Maier & Neustadt, P.C.

[57] ABSTRACT

A carbon material for use in a lithium secondary battery, which is obtained by graphitization conducted in the presence of a boric compound so as to contain boron in an amount ranging from 1,000 ppm to 30,000 ppm and which, when subjected to X-ray diffractometry, exhibits an interplanar spacing of 002 surface ($d_{002}$) of not greater than 0.338 nm, a crystallite size along c-axis (Lc) of at least 35 nm, a crystallite size along a-axis (La) of at least 50 nm and a ratio of diffraction peak (101) to diffraction peak (100), designated as $P_{101}/P_{100}$, of at least 1.0; a negative electrode and a lithium secondary battery each produced by using the above carbon material; and a process for producing the carbon material. This carbon material exhibits large charge and discharge capacities, so that it can provide a negative electrode for use in a lithium secondary battery which is excellent in charge and discharge cycle characteristics.

6 Claims, 2 Drawing Sheets

CARBON MATERIAL FOR LITHIUM SECONDARY BATTERY AND PROCESS FOR PRODUCING THE SAME

FIELD OF THE INVENTION

The present invention relates to a carbon material enabling production of a lithium secondary battery having not only large charge and discharge capacities but also a high energy density and being excellent in charge and discharge cycle characteristics. Further, the present invention relates to a negative electrode and a lithium secondary battery in which the above carbon material is used and a process for producing the carbon material.

More particularly, the present invention is concerned with a carbon material, especially, a mesophase pitch based carbon material for use in a negative electrode of lithium secondary battery, which is obtained by graphitization conducted in the presence of boron per se and/or a boric compound (hereinafter referred to collectively as "boric compound") so as to contain a predetermined amount of boron and which has a small spacing of graphite layers and a high graphitization degree, a negative electrode and a lithium secondary battery in which the above carbon material is used, and a process for producing the carbon material.

BACKGROUND OF THE INVENTION

The secondary battery in which an alkali metal such as lithium is used as an active material of a negative electrode has generally various advantages. For example, it not only ensures high energy density and high electromotive force, but also has wide operating temperature range due to the use of a nonaqueous electrolyte. Further, the secondary battery is excellent in shelf life, miniaturized and lightweight.

Therefore, the practical use of the above nonaqueous-electrolyte lithium secondary battery is anticipated as a power source for use in a portable electronic appliance and also as a high-performance battery for use in an electric vehicle and electricity storage.

However, all the developed prototype batteries have not fully realized the above properties anticipated from the lithium secondary battery, and thus have been incomplete from the viewpoint of cycle life, charge and discharge capacities and energy density.

A major cause thereof resided in a negative electrode used in the secondary battery.

For example, a lithium secondary battery having a negative electrode composed of metal lithium incorporated therein had disadvantageously short cycle life and poor performance stability because lithium deposited on the surface of the negative electrode during charging formed acicular dendrite causing short-circuit to be likely to occur between the negative and positive electrodes.

Lithium has extremely high reactivity, thereby causing the electrolyte to suffer from decomposition reaction in the vicinity of the surface of the negative electrode. Thus, there was the danger that the above decomposition reaction would modify the surface of the negative electrode to thereby cause repeated uses of the secondary battery to lower the cell capacity.

Various studies have been made on the material of the negative electrode with a view toward obviating the above problems of the lithium secondary battery.

For example, the use of alloys containing lithium, such as lithium/aluminum alloy and Wood's alloy, as the material of the negative electrode of the lithium secondary battery has been studied. However, this negative electrode composed of such a lithic alloy had a problem of crystal structure change attributed to the difference in operating temperature and charge and discharge conditions.

Further, the use of carbon materials (the terminology "carbon material" used herein comprehends graphite materials) as the material of the negative electrode of the lithium secondary battery has been studied.

For example, an attempt has been made to capture lithium ions formed during charging between graphite layers of a carbon material (intercalation) to thereby produce a compound known as "intercalation compound" for the purpose of preventing the formation of dendrite.

Carbon fibers derived from coal, coke and PAN and isotropic pitch-based carbon fibers have been extensively studied as the above carbon materials.

However, these carbon materials have several drawbacks, for example, in that not only are graphite crystallites small but also the crystals are disorderly arranged, so that the charge and discharge capacities thereof are unsatisfactory, and in that, when the current density is set high at the time of charging or discharging, decomposition of the electrolyte occurs to thereby lower the cycle life.

Graphite materials such as natural and artificial graphites are now attracting most intensive attention as the carbon material for forming the negative electrode for use in the lithium secondary battery and are being extensively studied.

Although the chargeable or dischargeable capacity per weight of the natural graphite is pretty large if the graphitization degree thereof is high, the natural graphite has drawbacks in that the current density ensuring ready discharge is low and in that the charging and discharging at a high current density would lower the charge and discharge efficiency. This natural graphite material is not suitable for use in a negative electrode of a high-load power source from which a large amount of current must be discharged and into which it is desired to effect charging at a high current density in order to cut charging time, e.g., a power source for a device equipped with a drive motor or the like.

In the negative electrode composed of conventional artificial graphite, the inter-graphite-layer volume as a whole is so satisfactory of the conventional artificial graphite that large charge and discharge capacities are obtained, as long as the graphitization degree thereof is high. However, the artificial graphite has also not been suitable for charging and discharging at a high current density.

In the contemporary lithium-ion secondary battery in which use is made of the negative electrode comprising the graphite material, the current density at the time of charging is generally in the range of 20 to 35 mA/g, and thus the charging takes about 10 hr in view of the charge capacity. If the charging can be performed at a higher current density, for example, 100 mA/g, however, the charging time can be as short as 3 hr. Further, if the current density is 600 mA/g, the charging time can be even as short as 30 min.

It has been reported that, among the above graphite materials which include natural and artificial graphites, graphite fibers obtained by graphitizing carbon fibers of which a starting material is mesophase pitch is superior in various battery properties, as disclosed in Japanese Patent Laid-Open Publication No. 6(1994)-168725.

However, the artificial graphites such as the graphite fiber are various in the size and configuration of crystallites, the content of impurities, etc., depending on the type of the starting material and the manufacturing conditions. Thus, the problem is encountered that, with respect to the above graphite fiber as well, it can hardly be stated that the internal texture structure of the fiber is controlled so as to take a form optimum as the carbon material for lithium-ion secondary battery. Consequently, the current situation is that a carbon material which is satisfactory in all respects including cycle life and charge and discharge capacities has not yet been developed. Japanese Patent Laid-Open Publication No. 6(1994)-33601-333601 and Japanese Patent Laid-Open Publication No. 7(1995)-73898 disclose a lithium secondary battery in which the carbon material having part of the graphite-layer forming carbon atoms thereof replaced by boron atoms is used as the carbon material of the lithium secondary battery to thereby improve lithium-associated charge and discharge capacities. However, the above carbon material without exception is synthesized by the CVD process in which use is made of boron chloride ($BCl_3$) and benzene ($C_6H_6$) and has had a drawback in that the charge and discharge efficiency (discharge capacity/charge capacity) cannot satisfactorily be enhanced. Further, the problem is encountered that, in replacing graphite-crystal-lattice forming carbon atoms per se by other atoms according to the CVD process, not only is a special complicated device needed but also a considerably high technique is necessary for controlling the degree of the replacement.

Further, Japanese Patent Laid-Open Publication No. 3(1991)-245458 proposed the use as a negative electrode of lithium secondary battery of the carbon material or carbon fiber which is obtained by sintering various organic materials, especially a carbon fiber based on a copolymer of furfuryl alcohol and maleic anhydride or a polyamide in the presence of a boric compound at a temperature as low as about 1,200° C. and which has a boron content of 0.1 to 2.0% by weight. However, the carbon material obtained by the proposed sintering method is not satisfactory in respect of the increase of charge and discharge capacities of the secondary battery including a negative electrode composed of the above carbon material, even if the residual boron content is increased. Especially, the use of this carbon material has not attained any improvement in cell voltage.

Still further, Japanese Patent Laid-Open Publication No. 5(1993)-251080 proposed the carbon material obtained by adding, for example, $H_3BO_3$ to natural graphite and sintering the resultant natural graphite at 1,000° C. The disclosure of this literature includes the suggestion of adding boron in an amount of up to 10% by weight prior to the sintering of natural graphite for facilitating incorporation of lithium ions in the carbon material to thereby improve the battery performance exhibited when the carbon material is used in the negative electrode of the battery. However, when used as a negative electrode, the thus obtained carbon material suffered from a serious cycle deterioration of charge and discharge capacities and was unable to realize a high charge and discharge efficiency (discharge capacity/charge capacity).

The inventors have conducted extensive and intensive studies with a view toward overcoming the above drawbacks of the prior art. As a result, it has been found that the carbon material obtained by molding an organic starting material, preferably, a mesophase pitch into a desired shape and graphitizing the molding in the presence of a boric compound contains a given amount of boron, has a graphite layer crystal structure and an internal texture structure in which the lithium incorporation in or departure from the carbon material is facilitated and exhibits scarce deterioration of the charge and discharge capacities and charge and discharge efficiency attributed to the repetition of the lithium incorporation in or departure from the carbon material. The present invention has been completed on the basis of the above finding.

OBJECT OF THE INVENTION

The object of the present invention is to overcome the above drawbacks of the prior art and is to provide a carbon material capable of providing a lithium secondary battery which has large charge and discharge capacities, exhibits high initial charge and discharge efficiency and charge and discharge velocities and has long cycle life, a negative electrode and a lithium secondary battery in which use is made of the above carbon material and a process for producing the carbon material.

SUMMARY OF THE INVENTION

The carbon material for use in a lithium secondary battery according to the present invention is obtained by graphitization conducted in the presence of a boric compound, exhibiting, when subjected to X-ray diffractometry, an interplanar spacing of 002 surface ($d_{002}$) of not greater than 0.338 nm, a crystallite size along c-axis (Lc) of at least 35 nm, a crystallite size along a-axis (La) of at least 50 nm and a ratio of diffraction peak (101) to diffraction peak (100), designated as P101/P100, of at least 1.0, and containing boron in an amount ranging from 1,000 ppm to 30,000 ppm.

Although the starting material and configuration of the carbon material for use in a lithium secondary battery according to the present invention are not particularly limited, it is preferred that this carbon material be in the form of mesophase pitch based milled carbon fibers.

The negative electrode for use in a lithium secondary battery according to the present invention comprises the above carbon material of the present invention.

The lithium secondary battery of the present invention comprises an electrolyte containing a lithium salt, a positive electrode and a negative electrode comprising the above carbon material of the present invention.

The process for producing a carbon material for use in a lithium secondary battery according to the present invention comprises the steps of:

spinning a mesophase pitch to thereby obtain pitch fibers, infusibilizing the pitch fibers to thereby obtain infusibilized pitch fibers, said infusibilized pitch fibers being subjected to light carbonization at a temperature of not higher than 1,500° C. according to necessity, milling the infusibilized or lightly carbonized pitch fibers, and graphitizing the milled fibers at a temperature of not lower than 2,200° C. in the presence of a boric compound.

DETAILED DESCRIPTION OF THE INVENTION

The present invention will be described in greater detail below.

The carbon material for use in a lithium secondary battery according to the present invention is obtained by a specified graphitization and has not only a specified graphite crystal structure and internal texture structure but also a specified boron content. The terminology "carbon material" used herein means a carbon material which is not particularly limited with respect to its configuration and comprehends those of various forms and configurations including fibrous carbon materials of various forms such as continuous fiber, milled fibers, paper and mat, and spherical carbon materials.

The carbon material of the present invention has a crystal structure such that, when subjected to X-ray diffractometry, it exhibits an interplanar spacing of 002 surface ($d_{002}$) of not greater than 0.338 nm, preferably, not greater than 0.336 nm, a crystallite size along c-axis (Lc) of at least 35 nm, preferably, at least 45 nm, a crystallite size along a-axis (La) of at least 50 nm, preferably, at least 60 nm and a ratio of diffraction peak (101) to diffraction peak (100), designated as $P_{101}/P_{100}$, of at least 1.0, preferably, from 1.1 to 2.5.

The above crystal parameters obtained by X-ray diffractometry which suggest the graphite crystal structure and texture structure of the carbon material of the present invention also indicate an index of the degree of graphitization of each carbon material. It is required for the improvement of the battery performance that all the above ranges of the parameters be satisfied. The above crystal parameters can be determined by the following X-ray diffractometry.

Illustratively, the X-ray diffractometry employed in the determination of the crystal parameters is a method in which a diffraction pattern of the carbon material such as the carbon fiber is obtained with the use of Cukα and a highly purified silicon as the X-ray source and reference material, respectively. The interplanar spacing of 002 surface ($d_{002}$) and size of crystallite along the c-axis ($Lc_{002}$) have respectively been calculated from the peak position and half-value width of the 002 diffraction pattern, and the size of crystallite along the a-axis ($La_{110}$) has been calculated from the peak position and half-value width of the 110 diffraction pattern, in accordance with the method of the Japan Society for Promotion of Scientific Research. The peak ratio of P101/P100 is determined through a procedure comprising drawing a base line on the obtained diffraction pattern diagram, measuring the heights of diffraction peak 101 (2θ approximately equal to 44.5) and diffraction peak 100 (2θ approximately equal to 42.5) from the base line and calculating the quotient of the height of diffraction peak 101 divided by the height of diffraction peak 100.

The carbon material of the present invention which has the above graphite crystal structure and internal texture structure is produced by graphitization conducted in the presence of a boric compound and contains boron in an amount ranging from 1,000 ppm to 30,000 ppm, preferably, from 2,000 ppm to 27,000 ppm and, still preferably, from 5,000 ppm to 23,000 ppm.

When the boron content is less than 1,000 ppm, any significant performance improving effect cannot be anticipated with respect to the charge and discharge characteristics evaluated at an identical graphitization degree. On the other hand, when the boron content exceeds 30,000 ppm, not only is mutual binding of carbon material components likely to occur but also the trend toward performance deterioration is encountered with respect to the charge and discharge characteristics.

The above boron content of the carbon material can be measured by the plasma emission spectrometry.

The carbon material which is produced by graphitization in the presence of a boric compound, possesses the above specified graphite crystal structure and internal texture structure and has the above specified boron content exhibits specified characteristics in a cyclic Voltamogram obtained in the measurement using a three-electrode cell including a working electrode composed of the carbon material, a reference electrode and a counter electrode each composed of metallic lithium and a nonaqueous electrolyte of lithium salt.

The characteristics of the carbon material of the present invention exhibited in the cyclic Voltamogram obtained in the measurement using the above three-electrode cell will be illustrated below with reference to FIGS. 1 and 2.

Figure 1:
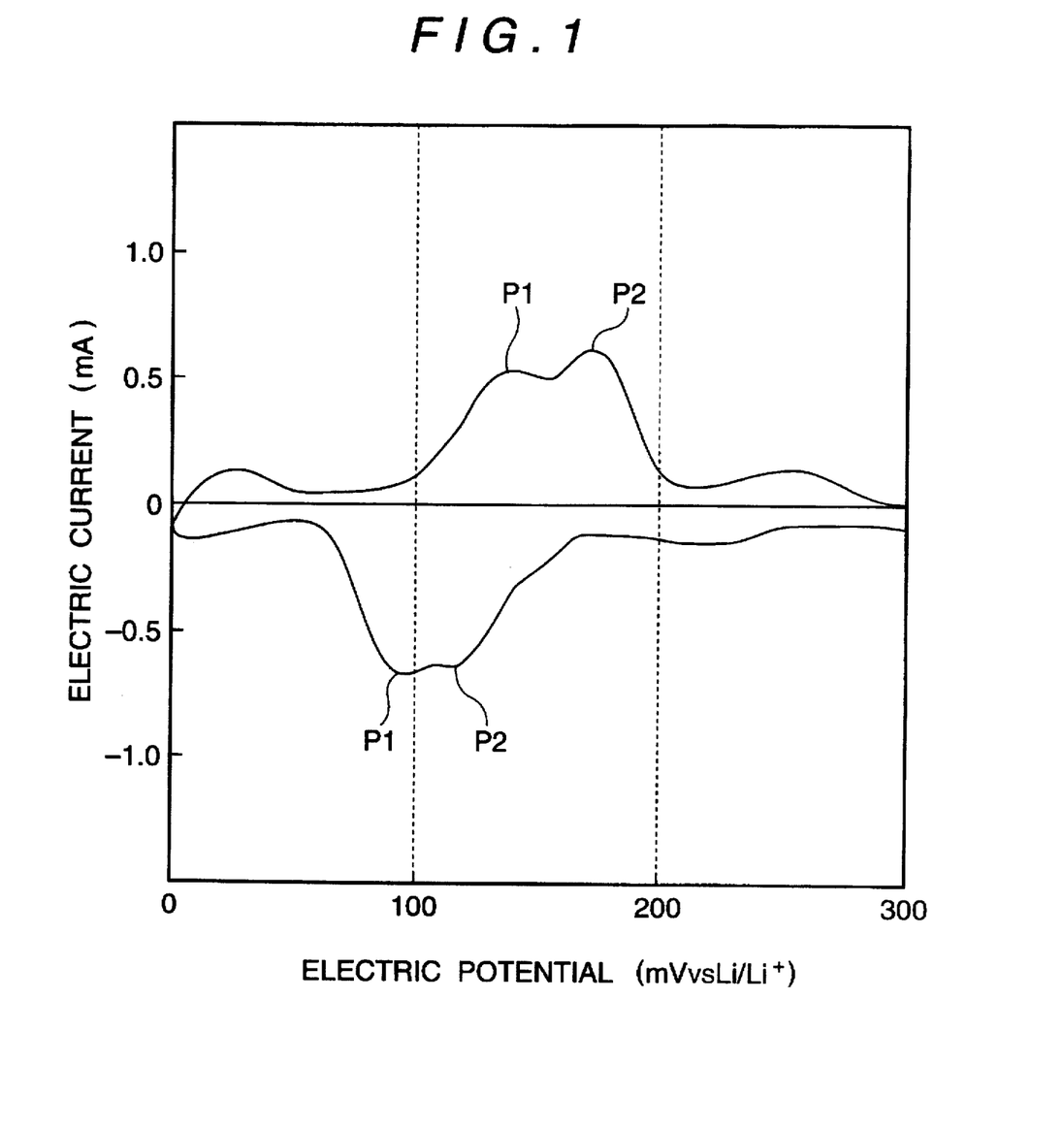
FIG. 1 is a cyclic Voltamogram of the carbon material produced in Example 1.

FIG. 1 shows the cyclic Voltamogram at the first cycle which was obtained when the above three-electrode cell including the working electrode composed of the carbon material (milled graphite fibers) produced in Example 1 was connected to a potentiostat and the potential to the reference electrode was provided with reciprocating changes from 300 mV to 0 mV at a sweep rate of 0.3 mV/min. FIG. 2 shows the cyclic Voltamogram at the first cycle which was obtained in the same manner as in FIG. 1 above except that the above three-electrode cell included the working electrode composed of the milled graphite fibers substantially not containing boron (Comparative Example 2).

Figure 2:
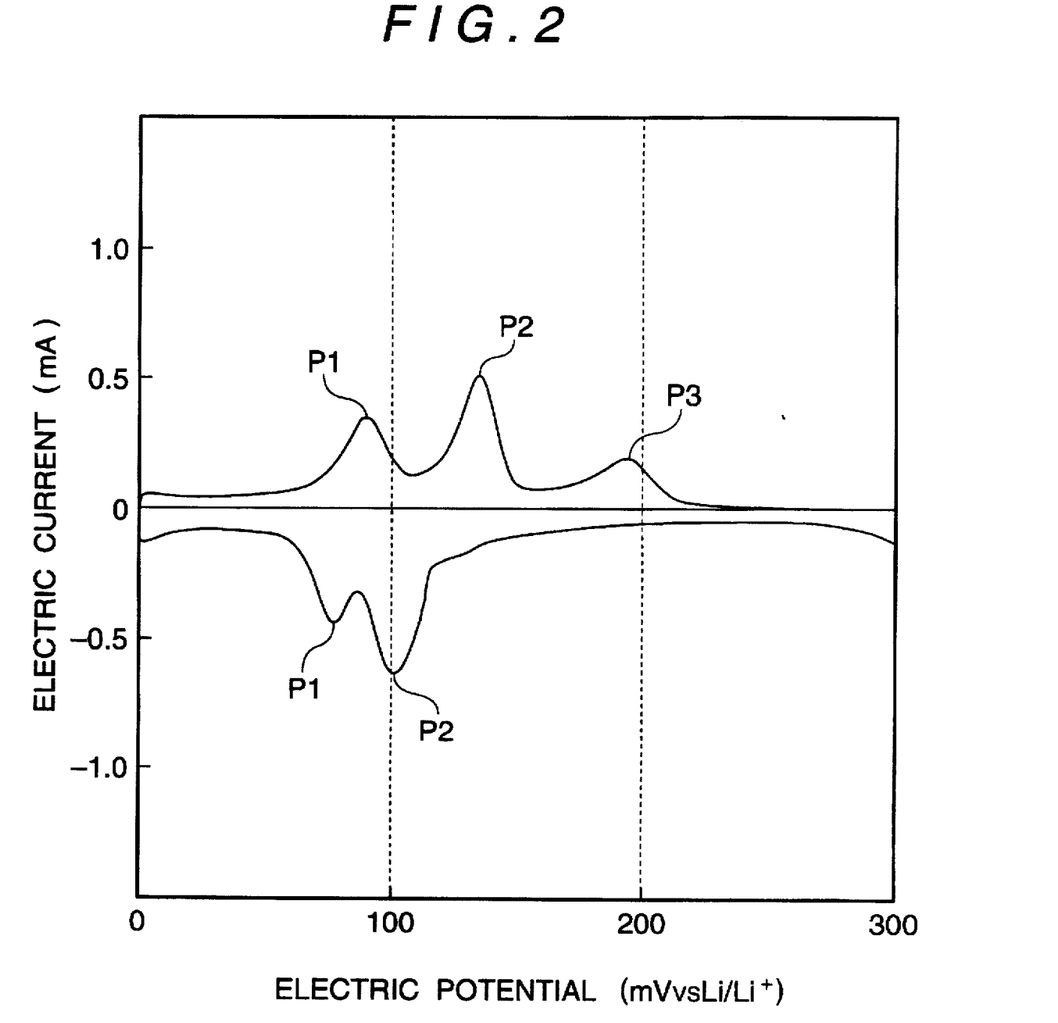
FIG. 2 is a cyclic Voltamogram of the carbon material produced in Comparative Example 1 (prior art).

In FIGS. 1 and 2, the lower-side curve represents the electric current which flows from the working electrode to the counter electrode when the potential of the working electrode to the reference electrode is decreased and indicates the stage during which lithium ions enter the milled graphite fibers, i.e., the charging mode. On the other hand, the upper-side curve represents the electric current which flows when the above potential is increased and indicates the stage during which lithium ions depart from the milled graphite fibers, i.e., the discharging mode.

In the above three-electrode cell, first, lithium ions of the electrolyte tend to enter between graphite lattice planes of the milled graphite fibers, so that the working electrode has a potential of plus 300 mV. As the potential of the working electrode is decreased, lithium ions having entered between graphite layer faces react with carbon at a specified potential so that a charging mode results in which a carbon-lithium intercalation compound corresponding to that potential is formed, thereby causing the current to flow from the working electrode to the counter electrode.

Referring to FIG. 2, it is observed that the use of the conventional milled graphite fibers substantially not containing boron brings about two major peaks consisting of peak P2 ascribed to the change at a potential of about 100 mV from the third stage (intercalation compound: C/Li=24/1) to the second stage (intercalation compound: C/Li=12/1) and peak P1 ascribed to the change at a potential of about 70 mV from the second stage (intercalation compound: C/Li=12/1) to the first stage (intercalation compound: C/Li=6/1) and that the peaks P1 and P2 are nearly completely separated from each other. Further, when the potential is caused to drop to 0 mV and, then, the potential of the working electrode is increased, the occurrence of peak P1, peak P2 and peak P3 is observed which are respectively ascribed to the change at a potential of about 90 mV from the first stage to the second stage, the change at a potential of about 130 mV from the second stage to the third stage and the change at a potential of about 190 mV from the third stage to the fourth stage. In this instance as well, the three peaks P1, P2 and P3 are nearly completely separated from each other. These peaks would be ambiguous when the sweep rate is too high, so that it is preferred that the sweep rate be not greater than 0.3 mV/min in the present invention.

By contrast, in the charging mode using the carbon material containing boron according to the present invention, the two peaks P1 and P2 as shown in FIG. 1 become a broad peak in which the valley between the peaks P1 and P2 is filled up. In the discharging mode as well, two peaks P1 and P2 become a similar broad peak in which the valley between the two peaks P1 and P2 is filled up although the entirety thereof shifts toward the high voltage side.

The occurrence of the above phenomenon with respect to graphitic materials has not been found to now. It is apparent that the carbon material of the present invention which exhibits the above characteristics in the cyclic Voltamogram has large charge and discharge capacities which are represented by the integral value of current flowing at each potential.

The reason for the shift of the peaks P1, P2 in FIG. 1 relative to those in FIG. 2 (toward an about 30 mV high voltage side) is assumed to be that the boron is an element having the properties of electron acceptor and having less electrons than that of carbon, so that the carbon/boron compound is superior to carbon per se in the facilitation of stable occlusion of lithium ions.

In the carbon material of the present invention, it is assumed that the graphitization in the presence of a boric compound causes the boron to form a compound with carbon or to be present between graphite layers in some form or have an otherwise complex form. However, it has not yet been elucidated in what form the boron is present in the carbon material. Moreover, although it is believed that the above peculiar properties in charge and discharge and the phenomenon of the binding of carbon material components described later are caused by the presence of boron in the carbon, the causal relation thereof has not yet been clearly elucidated.

In the above described carbon material of the present invention, it is preferred to lower the content of impurities other than boron for the enhancement of the charge and discharge efficiency.

The carbon material generally contains compounds of elements other than carbon, such as nitrogen, oxygen, sulfur and various metal components, depending on the type of the employed starting material.

In the secondary battery, lithium reacts with elements other than carbon, such as sulfur, nitrogen and halogens, to thereby form lithium compounds, so that the use of the carbon material containing such impurities in high proportions in a negative electrode leads to grave lowering of the charge and discharge efficiency, especially, the initial charge and discharge efficiency of the negative electrode.

Therefore, it is preferred that the total content of such impurities other than boron be limited to not greater than 1,000 ppm, especially, not greater than 300 ppm to thereby enable use of the carbon material of high purity.

The above total content of impurities can be measured by the flame photometry, plasma fluorescence analysis, ion chromatography or the like.

As described above, the carbon material for use in a lithium secondary battery according to the present invention is produced by the specified graphitization, possesses the specified graphite layer structure and crystal structure and has the specified boron content. The configuration of the above carbon material of the present invention is not particularly limited and various forms can be comprehended therein.

However, from the viewpoint that the entry and exit of lithium ions are easy, it is preferred that the carbon material have the form of short fibers or granules enabling increase of the area of graphite layer plane exposed at the surface of the carbon material. Suitable examples of the carbon materials having these forms include milled carbon fibers and carbon microbeads.

For example, when the carbon material is a continuous carbon fiber and has an internal texture structure (graphite layer structure) such that the entry of lithium ions from the periphery of the fiber is difficult, the entry and exit of lithium ions are executed only across sections of the fiber to thereby exhibit the tendency that the increase of charge and discharge velocities is accompanied by conspicuous lowering of the capacity. Therefore, in the present invention, it is preferred that the carbon material be in the form of milled carbon fibers having a small fiber length, i.e., having a large proportion of fiber sections, so that the entry and exit of lithium ions has been facilitated. Herein, the terminology "milled carbon fibers" generally refers to a mass of fibers milled so as to each have a length of 1 mm or less. Thus, for example, the milled carbon fibers are different from the chopped carbon fiber strands having a length of greater than 1 mm but not greater than 25 mm.

On the other hand, the carbon microbeads are advantageous in that the graphite layer plane can be exposed substantially all over the surface of the microbeads to thereby enable the entry and exit of lithium ions everywhere on the surface of the microbeads.

In the present invention, it is preferred that the above milled carbon fibers (graphite fibers) and carbon microbeads have an average diameter of 8 to 50 μm, preferably, 10 to 30 μm.

When the average diameter of the milled carbon fibers and carbon microbeads is smaller than 8 μm, the area of active graphite layer exposed at the surface of the carbon material becomes too large, so that the decomposition of electrolyte becomes rapid in the secondary battery including that carbon material to thereby lower the initial charge and discharge efficiency and intensify the cycle deterioration. On the other hand, when the average diameter of the carbon material is greater than 50 μm, the bulk density of the electrode becomes low to thereby unfavorably decrease the energy density per volume. Further, this is unfavorable from the viewpoint of short circuit.

This average diameter can be calculated from the particle size distribution determined by the laser diffractometry.

The variance of aspect ratio (ratio of length to diameter of milled fibers) of milled carbon fibers is preferred to range from 1 to 30, especially, from 1 to 20.

When the carbon material contains milled carbon fibers having an aspect ratio of more than 30, i.e., milled carbon fibers of relatively long fiber length, unfavorably, not only is the bulk density lowered to thereby decrease the energy density per volume but also a short circuit is caused between the positive and negative electrodes. On the other hand, when the carbon material contains milled carbon fibers having an aspect ratio of less than 1, unfavorably, the proportion of fibers suffering from longitudinal cracking along the fiber axis is likely to be increased.

The above range of variance of aspect ratio is determined by measuring the variance with respect to 100 extracted samples of obtained milled carbon fibers.

The above described carbon material of the present invention can be efficiently produced by, for example, the process which will be set forth below.

Although the starting material of the carbon material of the present invention can arbitrarily be selected from the various organic materials customarily employed as raw carbon or graphite materials, depending on the configuration and properties which the carbon material is desired to possess, it is preferred to employ easily graphitizable hydrocarbons. Examples of such easily graphitizable hydrocarbons include condensed polycycle hydrocarbon compounds such as naphthalene and phenanthrene and condensed heterocycle compounds such as petroleum and petroleum pitch.

In the production of a fibrous or granular carbon material, it is preferred to employ petroleum or petroleum pitch, especially, optically anisotropic pitch, i.e., mesophase pitch. Although a mesophase pitch of 100% mesophase content is preferred, the type of mesophase pitch is not particularly limited as long as it can be molded into desired form, namely, can be spun or rendered granular.

In the process for carbon material production according to the present invention, the above organic material is molded into desired form, for example, fibrous or granular form and subsequently graphitized under specified conditions. Alternatively, depending on the configuration of the produced carbon material, the process can be comprised of infusibilizing the molded starting material, optionally conducting light carbonization, machining, for example, milling the infusibilized material and graphitizing the machined (milled) material.

The process for carbon material production according to the present invention in which the carbon material in the form of carbon fiber, milled carbon fibers or carbon microbeads is obtained from pitch as the starting material will be described in greater detail below.

In the production of the carbon material in the form of continuous carbon fiber or milled carbon fibers (these may be collectively referred to as "carbon fiber") according to the present invention, first, the above starting material is spun by the customary method and, then, the obtained pitch fiber is infusibilized and graphitized.

Pitch as the starting material for production of the carbon fiber is usually melt spun. The melt spinning method is not particularly limited, and the spinning can be accomplished by the use of various techniques, such as melt spinning, melt blow, centrifugal and vortex spinning techniques. Especially, the melt blow spinning technique is preferred from the viewpoint of the spinning productivity and the quality of obtained fiber. The melt blow spinning of pitch fiber is advantageous in that the arrangement of graphite layer plane in parallel to the fiber axis is facilitated by spinning a pitch having a viscosity as low as not greater than tens of poises followed by high-speed cooling.

In the spinning of pitch as the starting material by the melt blow spinning technique, each spinning orifice is preferred to have a diameter ranging from 0.1 to 0.5 mm, especially, from 0.15 to 0.3 mm.

The use of a spinning orifice having a diameter of more than 0.5 mm is unfavorable from the viewpoint of product quality control because the fiber diameter is likely to become as large as 25 μm or greater and is further likely to disperse.

On the other hand, when the spinning orifice has a diameter of less than 0.1 mm, the disadvantage is encountered that not only is the spinning orifice likely to suffer from clogging during the spinning but also the manufacture of a spinning nozzle with the orifice is difficult.

Further, it is desired from the view point of productivity that the spinning speed is at least 500 m/min, preferably, at least 1,500 m/min and, still preferably, at least 2,000 m/min.

The spinning temperature depends to some extent on the type of pitch as the starting material. Generally, the spinning temperature is higher than the softening point of the pitch and does not decompose the pitch, and may range from 300° C. to 400° C., especially, from 300° C. to 380° C.

Although the softening point of the starting pitch is not particularly limited in the melt blow spinning of the pitch, taking into account the relation with the above spinning temperature, it is advantageous to employ a starting pitch having low softening point and ensuring a high reaction rate of the infusibilization from the viewpoint that the production is stabilized and the cost is low. Therefore, it is preferred that the softening point of the starting pitch range from 230° to 350° C., especially, from 250° to 310° C.

The thus spun pitch fiber can be infusibilized by various customary methods, for example, the method in which the fiber is heated in an oxidative gas atmosphere of nitrogen dioxide, oxygen or the like, the method in which the fiber is treated in an oxidative aqueous solution of nitric acid, chromic acid or the like and the method in which the fiber is subjected to polymerization treatment using light or gamma rays.

An easier method for infusibilizing the fiber is one in which the fiber is heated in the air. In this method, the average temperature elevation rate is varied to some extent depending on the type of the starting material but is generally at least 3° C./min, preferably, at least 5° C./min. The heating treatment is performed while raising the temperature up to about 350° C.

In the production of the carbon material having the form of a continuous carbon fiber, the thus obtained infusibilized pitch fiber is directly graphitized. Alternatively, the obtained infusibilized pitch fiber can first be subjected to light carbonization in an inert gas at 250° to 1,500° C., preferably, 500° to 900° C. and then graphitized.

In the production of the carbon material having the form of milled carbon fibers, it is preferred that the pitch fiber having been infusibilized or subjected to light carbonization be milled prior to graphitization. It is practical to first effect a light carbonization of the obtained infusibilized pitch fiber in an inert gas at 250° to 1,500° C., preferably, 500° to 900° C. and then mill the lightly carbonized fiber.

Milling of the pitch fiber having been infusibilized or subjected to light carbonization can reduce the longitudinal fiber cracking attributed to milling. Conducting graphitization at high temperatures after the milling is advantageous because polycondensation and cyclization reaction are advanced at the graphite layer plane newly exposed on the fiber surface by the milling to thereby enable lowering the activity of the surface to inhibit the decomposition of the electrolyte.

Conducting heat treatment (carbonization or graphitization) at temperatures exceeding 1,500° C. and thereafter milling is not desirable because cracks are likely to occur along the graphite layer plane having grown along the fiber axis with the result that the proportion of broken surface area to the total surface area of the produced milled carbon fibers is likely to increase to thereby invite the localization of electrons on the broken graphite layer plane and thus the decomposition of the electrolyte.

The carbonization scarcely occurs at temperatures lower than 250° C., so that the heat treatment at such temperatures is ineffective.

The milling of the pitch fiber having been infusibilized or subjected to light carbonization can effectively be carried out by the use of, for example, the Victory mill, jet mill or cross flow mill.

As is common to the above mentioned methods, the milling suitable for the present invention can effectively be conducted by rotating a rotor equipped with a blade (or blades) at a high speed to thereby cut the fiber in the direction perpendicular to the fiber axis.

The lengths of milled fibers can be controlled by regulating the rotating speed of the rotor, the angle of the blade(s), the size of porosity of a filter attached to the periphery of the rotor, etc.

The carbon fiber milling has been conducted by means of the Henschel mixer, ball mill or crusher. These means are disadvantageous because pressure applies to the fiber in the direction at right angles to the fiber to thereby increase the probability of longitudinal cracking along the fiber axis. Further, these means cannot be stated to provide a suitable milling method because the milling takes a prolonged period of time.

For the manufacture of a negative electrode of high bulk density for use in a secondary battery, it is preferred that production conditions be regulated so that the configuration of the milled carbon fibers after the graphitization falls within the above-mentioned ranges, for example, has a dispersion range of an aspect ratio ranging from 1 to 30, preferably, from 1 to 20.

For example, from the viewpoint of the above aspect ratio and average diameter of the carbon material, it is preferred that the diameter of the fiber before the milling be regulated so as to range from 4 to 25 µm, taking into account the volume reduction caused by the milling and the graphitization.

As described above, in the production of the carbon material having the form of a carbon fiber, the pitch fiber having been infusibilized or subjected to light carbonization is brought as it is (in the production of continuous carbon fiber) or via milling (in the production of milled carbon fibers) to graphitization.

On the other hand, the production of the carbon material having the form of carbon microbeads is conducted by first preparing mesocarbon microbeads composed of mesophase pitch and subjecting them to graphitization. Mesocarbon microbeads may be produced by any of various conventional methods and, for example, can be produced by heating the starting pitch at about 350° C. and separating the thus formed mesocarbon microbeads.

A modified pitch can be mentioned as an especially suitable starting material for use in the production of mesocarbon microbeads, which modified pitch is produced by mixing a pitch whose aromatic carbon ratio (fa) is at least 0.6, Lewis acid and a solvent therefor, heating the mixture at 100° to 300° C. and removing the Lewis acid and solvent from the obtained reaction product (Japanese Patent Laid-Open Publication No. 2(1990)-4995).

Examples of the Lewis acids which can be used in the production of the above modified pitch include $BF_3$, $HF—BF_3$, anhydrous $AlCl_3$, anhydrous $CuCl_3$, anhydrous $ZnCl_3$ and anhydrous $SnCl_3$.

The solvent for the starting pitch and Lewis acid is preferred to have a boiling point ranging from 100° to 350° C., be chemically stable when mixed with the solutes and ensure ready separation from the reaction product. Examples of such solvents include dichlorobenzene, nitrobenzene and trichlorobenzene.

The reaction of the starting pitch with the Lewis acid is generally carried out under conditions such that the molar proportion of starting pitch: Lewis acid: solvent is in the range of 1:0.3 to 5:2.5 to 50 and that the reaction time ranges from 1 to 30 hr. These molar ratio and reaction time are appropriately selected depending on the type and amount of Lewis acid.

The modified pitch is produced by removing the Lewis acid and solvent from the product of the above reaction. The solvent can be removed, for example, by distillation in an inert gas atmosphere. The Lewis acid can be removed by washing with an aqueous solvent such as dilute hydrochloric acid or by distillation in an inert gas atmosphere or in vacuum.

Mesocarbon microbeads can be produced by heating the thus obtained modified pitch at 200° to 380° C. and separating the formed mesocarbon microbeads.

The diameter of mesocarbon microbeads can be regulated by changing the heating temperature within the above range.

The separation of the thus formed mesocarbon microbeads can be conducted, for example, by extracting the isotropic pitch remaining along with the mesocarbon microbeads in the reaction product with its solvent.

A characteristic feature of the process for carbon material production according to the present invention resides in executing graphitization of the material such as the above continuous fiber having been infusibilized or lightly carbonized, milled carbon fibers obtained by milling the continuous fiber and mesocarbon microbeads in the presence of a boric compound, so that graphite crystal structure obtained by high-level graphitization (for example, the interplanar spacing of 002 surface ($d_{002}$) as measured by X-ray diffractometry being not greater than 0.338 nm) and the specified internal texture structure (for example, crystallite Lc being at least 35 nm) are formed and that the specified amount of boron is caused to be present in the carbon material.

Examples of the boric compounds for use in the graphitization according to the present invention include boron per se, boron carbide ($B_4C$), boron chloride, boric acid, boron oxide, sodium borate, potassium borate, copper borate and nickel borate.

The method of adding this boric compound is not particularly limited. For example, the addition is generally achieved by directly adding a solid boric compound followed by uniformly mixing according to necessary or by preparing a solution of a boric compound followed by immersing the material to be graphitized in this solution.

In the use of the boric compound in the solid state, it is preferred that the boric compound be pulverized into an average particle size of not greater than 500 µm, preferably, not greater than 200 µm for the attainment of uniform mixing with, for example, milled fibers and mesocarbon microbeads.

Examples of the solvents suitably employed in the preparation of the solution of boric compound include water, methanol, glycerol and acetone. A suitable solvent is selected depending on the type of the added boric compound. Moreover, the boric compound can satisfactorily be added to the starting pitch prior to the subsequent treatments.

The above boric compound is added to the above material in an amount such that the boron content of the obtained carbon material ranges from 1,000 to 30,000 ppm.

In the present invention, it is important that the above carbon material precursor having the form of a continuous fiber, milled fibers or granules be graphitized to a high degree of graphitization. Thus, it is preferred that the graphitization be conducted in the presence of the boric compound at 2,200° C. or higher, especially, 2,400° C. or higher and, still especially, 2,400° to 3,100° C. Although the principle of the function of the boric compound exhibited at the time of graphitization has not yet been elucidated, the boric compound exerts the effects of promoting the graphitization and increasing the charge and discharge capacities in the use in a negative electrode of battery by the graphitization conducted at temperatures close to the melting point of the boric compound (the melting points of boron and boron carbide being 2,080° C. and 2,450° C, respectively).

Generally, the higher the heat treatment temperature, the greater is the graphitization of carbonaceous materials advanced. In the graphitization of the mesophase pitch based carbon fiber, although the carbon material of enhanced graphite crystal structure for use in batteries can be produced by graphitization at about 2,200° C. when it is conducted in the presence of the boric compound, the temperature for obtaining the above carbon material must be about 700° C. higher than the above, i.e. at least 2,900° C., when the boric compound is not used.

It is presumed that the realization of a graphite crystal structure grown as high as in the carbon material of the present invention in the absence of the boric compound requires graphitization at further higher temperatures, for example, about 3,100° C. However, the graphitization at such high temperatures is not only disadvantageous from the viewpoint of cost but also renders a stable continuous operation difficult in view of the current level of technology. Further, that graphitization is not practical because the temperature is very close to the sublimation point of carbon (3,370° C.).

Moreover, even if the compared carbon materials are substantially identical with respect to the structure shown by X-ray diffractometry measurement results, the carbon material graphitized in the presence of the boric compound has been found to be superior to the carbon material graphitized in the absence of the boric compound in battery performance such as discharge capacity and charge and discharge efficiency.

It is also preferred that the graphitization be conducted in the absence of oxygen, for example, in an inert gas atmosphere such as a nitrogen gas atmosphere. This is because oxygen reacts with carbon of the carbon material to thereby generate, for example, carbon dioxide gas, so that the yield of carbon material is likely to be lowered. Thus, when the boric compound added at the graphitization is an oxygenic compound such as boron oxide ($B_2O_3$: having a melting point of 450° C. or higher and a boiling point of 1,500° C. or higher), not only is the effect of promoting the graphitization exhibited but also the yield of carbon material is likely to be deteriorated.

In this graphitization, most impurities such as nitrogen, oxygen, sulfur and metal components contained in the carbon material precursor are expelled outside during the graphitization reaction. However, for the realization of the carbon material of higher purity, a purification treatment may be effected in which a halogen element (gas) such as chlorine is introduced so as to react with the impurities contained in the carbon material at the time of carbonization or graphitization to thereby expel the impurities outside as halides.

It is naturally preferred that a raw material whose impurity content is minimal be selected in the production of the starting pitch for the carbon material and that steps be taken for minimizing the impurities by, for example, filtration.

The carbon material of the present invention which can be obtained by the above process, especially, the milled carbon fibers and carbon microbeads can easily be fabricated into a high-performance negative electrode by adding a binder such as polyethylene or polytetrafluorothylene thereto, forming the binder-loaded carbon material by means of rolls under pressure into a shape suitable for use in a negative electrode, e.g., a sheet or plate and conducting reduction treatment with the use of metallic lithium as the counter electrode.

The thus produced negative electrode has a large capacity per volume, so that it is suitable for miniaturization of a battery.

The carbon material of the present invention can suitably be fabricated into a negative electrode having lithium ions as an active material of negative electrode, which is assembled together with an electrolyte and a positive electrode into a lithium-ion secondary battery.

Although the type of electrolyte to be incorporated in the above lithium-ion secondary battery is not particularly limited as long as it can dissolve a lithium salt, it is preferred to employ an aprotic organic solvent having high dielectric constant. Examples of such organic solvents include propylene carbonate, ethylene carbonate, tetrahydrofuran, 2-methyltetrahydrofuran, dioxolane, 4-methyldioxolane, acetonitrile, dimethyl carbonate, methylethyl carbonate, and diethyl carbonate. These solvents may be used either individually or in appropriate combination.

Lithium salts capable of forming stable anions can be suitably used as the electrolytic substance to be contained in the electrolyte, which include, for example, lithium perchlorate, lithium borofluoride, lithium hexafluoroantimonate and lithium hexafluorophosphate ($LiPF_6$).

Various materials can be used for composing the positive electrode of the above lithium-ion secondary battery, which include, for example, metal oxides such as chromium oxide, titanium oxide, cobalt oxide and vanadium pentoxide; lithium metal oxides such as lithium manganese oxide ($LiMn_2O_4$), lithium cobalt oxide ($LiCoO_2$) and lithium nickel oxide ($LiNiO_2$); transition metal chalcogen compounds such as titanium and molybdenum sulfides; and conductive conjugated polymeric substances such as polyacetylene, polyparaphenylene and polypyrrole.

A separator is interposed between the above positive and negative electrodes, which separator is comprised of a nonwoven or woven fabric of synthetic or glass fibers, a polyolefinic porous membrane, a nonwoven fabric of polytetrafluoroethylene or the like.

A current collector can be used as in the conventional batteries. The current collector for the negative electrode may have the form of a plate, a foil or a rod and may be composed of a conductor electrochemically inert to the electrode and the electrolyte, e.g., selected from among metals such as copper, nickel, titanium and stainless steel.

The lithium secondary battery of the present invention can be produced by assembling the above specified negative electrode as an essential constituting element, the electrolyte and the positive electrode with other battery constitutional elements such as the separator, the current collector, a gasket, a sealing plate and a casing into a cylindrical, rectangular or buttony lithium-ion secondary battery according to the customary procedure.

EFFECT OF THE INVENTION

As apparent from the foregoing, the carbon material for use in a lithium secondary battery according to the present invention is obtained by graphitization in the presence of a boric compound, possesses a specified crystal structure having specified values of crystal parameters measured by X-ray diffractometry, namely, the interplanar spacing of 002 surface ($d_{002}$), Lc, La and $P_{101}/P_{100}$ and has a specified boron content. Thus, the carbon material of the present invention can provide a negative electrode for use in a lithium secondary battery which ensures large charge and discharge capacities, high initial charge and discharge efficiency and charge and discharge velocities and a prolonged cycle life and can also provide a lithium secondary battery including such a negative electrode.

The process for carbon material production according to the present invention enables efficiently producing the above carbon material, especially, milled carbon fibers.

EXAMPLES

The present invention will further be illustrated with reference to the following Examples, which should not be construed as limiting the scope of the invention.

Example 1

A starting material of optically anisotropic petroleum mesophase pitch having a specific gravity of 1.25 was melted and spun through a nozzle comprising a 3 mm wide slit and, arranged therein, a row of 500 spinning orifices each having a diameter of 0.2 mm while injecting hot air through the slit, thereby obtaining pitch fibers having an average diameter of 13 μm. The spinning temperature was 360° C. and the delivery was 0.8 g/H-min.

The spun pitch fibers were collected on a belt having a collection zone of 20-mesh stainless steel net while sucking from the back of the belt.

The pitch fibers thus collected on the belt to become in the form of mat was heated in the air at temperature which was elevated from room temperature to 300° C. at an average elevation rate of 6° C./min to thereby infusibilize the fibers. Subsequently, the thus obtained infusibilized fiber mat was subjected to light carbonization at 700° C. and milled with the use of a cross flow mill to thereby obtain milled carbon fibers having an average diameter of 18 μm.

Boron carbide having an average particle size of 10 μm was added to the thus obtained precursory milled carbon fibers in an amount of 5% by weight, agitated so as to obtain a uniform mixture and heated at a temperature elevation rate of 3° C./min to 2,700° C. at which the mixture was held for 1 hr.

The boron content of the obtained milled carbon fibers was measured by plasma emission spectrometry, which was found to be 9,400 ppm. Further, the crystal parameters of the milled carbon fibers were measured by X-ray diffractometry. The obtained measurement results are shown in Table 1.

4.85 g of milled carbon fibers were kneaded together with 0.15 g of polytetrafluoroethylene and molded into a sheet for electrode (length: 10 mm, width: 10 mm and thickness: 0.08 mm). A three-electrode cell was assembled comprising the above sheet as a working electrode, and a reference electrode and its counter electrode each made of metal lithium (length: 15 mm, width: 15 mm and thickness: 1 mm). This cell was connected to a potentiostat and a charge and discharge test was performed under the following conditions. In the cell, use was made of an electrolyte obtained by dissolving lithium perchlorate ($LiClO_4$) as an electrolytic substance in a 1:1 (volume ratio) mixed carbonic ester solvent of ethylene carbonate (EC) and dimethyl carbonate (DMC) in a concentration of 1 M.

The characteristics of charge and discharge capacities were measured at a constant current of 100 mA/g. In the measurement, the measured potential range to the reference electrode potential was 0 to 2 V/Li/Li$^+$, and charge and discharge were repeated 10 times. The measurement results are shown in Table 1.

As shown in Table 1, the initial discharge capacity and charge and discharge efficiency were as high as 340 mAh/g and 92%, respectively, and the second discharge capacity and charge and discharge efficiency were also as high as 345 mAh/g and 100%, respectively. Further, the 2nd to 10th discharge capacities and charge and discharge efficiencies exhibited invariable values, which were 345 mAh/g and 100%, respectively.

Thereafter, the cyclic Voltamogram at the first cycle was prepared by connecting the same three-electrode cell as mentioned above to a potentiostat and providing the potential to the reference electrode with reciprocating changes from 300 mV to 0 mV at a sweep rate of 0.3 mV/min. The obtained results are shown in FIG. 1.

Examples 2 to 5

A carbon material was produced through graphitization in the same manner as in Example 1, except that the amount of boron carbide added to the milled precursor pitch fiber having undergone light carbonization and milling) was changed as specified in Table 1.

The crystal parameters of the obtained carbon material were measured by X-ray diffractometry.

A negative electrode and a three-electrode cell having the negative electrode were produced with the use of the above carbon material in the same manner as in Example 1. The characteristics of charge and discharge capacities were measured with the use of this three-electrode cell.

The boron content of the obtained milled carbon fibers, the crystal parameter measurement results obtained by X-ray diffractometry and the measurement results with respect to the characteristics of charge and discharge capacities are shown in Table 1.

TABLE 1

|  | Ex. 1 | Ex. 2 | Ex. 3 | Ex. 4 | Ex. 5 |
| --- | --- | --- | --- | --- | --- |
| Material to be graphitized | milled carbon fiber | milled carbon fiber | milled carbon fiber | milled carbon fiber | milled carbon fiber |
| Graphitization temp. (°C.) | 2,700 | 2,700 | 2,700 | 2,700 | 2,700 |
| Boric compound | boron carbide | boron carbide | boron carbide | boron carbide | boron carbide |
| Amt. of boric compd. added*[1] (wt. %) | 5 (3.9) | 1 (0.79) | 1.3 (1.0) | 13 (10.3) | 15 (11.9) |
| Boron content of carbon mat'l (ppm) | 21,000 | 4,000 | 5,000 | 28,000 | 29,000 |
| Crystal parameter by X-ray diffractometry |  |  |  |  |  |
| $d_{002}$ (nm) | 0.3355 | 0.3368 | 0.3368 | 0.3354 | 0.3370 |
| Lc (nm) | 74 | 40 | 42 | 92 | 42 |
| La (nm) | 100 ↑ | 82 | 83 | 100 ↑ | 85 |
| $P_{101}/P_{100}$ ratio | 1.72 | 1.09 | 1.10 | 2.21 | 1.11 |
| Negative electrode characteristics |  |  |  |  |  |
| initial discharge capacity (mAh/g) | 340 | 296 | 298 | 345 | 300 |
| initial charge/discharge efficiency (%) | 92 | 90 | 90 | 88 | 90 |
| 10th discharge capacity (mAh/g) | 345 | 298 | 300 | 340 | 310 |

TABLE 1-continued

|  | Ex. 1 | Ex. 2 | Ex. 3 | Ex. 4 | Ex. 5 |
|---|---|---|---|---|---|
| 10th charge/discharge efficiency (%) | 100 | 100 | 100 | 100 | 100 |

*[1]Parenthesized value is one determined in terms of boron.

Examples 6 and 7

A carbon material was produced through graphitization in the same manner as in Example 1, except that the milled precursor (pitch fiber having undergone light carbonization and milling) was graphitized at varied temperature (2,200° C. in Example 6 and 2,400° C. in Example 7).

The crystal parameters of the obtained carbon material were measured by X-ray diffractometry.

A negative electrode and a three-electrode cell having the negative electrode were produced with the use of the above carbon material in the same manner as in Example 1. The characteristics of charge and discharge capacities were measured with the use of this three-electrode cell.

The boron content of the obtained milled carbon fibers, the crystal parameter measurement results obtained by X-ray diffractometry and the measurement results with respect to the characteristics of charge and discharge capacities are shown in Table 2.

TABLE 2

|  | Ex. 6 | Ex. 7 |
|---|---|---|
| Material to be graphitized | milled carbon fiber | milled carbon fiber |
| Graphitization temperature (°C.) | 2,200 | 2,400 |
| Boric compound | boron carbide | boron carbide |
| Amount of boric compd. added*[1] (wt. %) | 5 (3.9) | 5 (3.9) |
| Boron content of carbon material (ppm) | 28,000 | 26,000 |
| Crystal parameter by X-ray diffractometry |  |  |
| $d_{002}$ (nm) | 0.3370 | 0.3361 |
| Lc (nm) | 41 | 47 |
| La (nm) | 88 | 98 |
| $P_{101}/P_{100}$ ratio | 1.06 | 1.20 |
| Negative electrode characteristics |  |  |
| initial discharge capacity (mAh/g) | 302 | 310 |
| initial charge/discharge efficiency (%) | 90 | 90 |
| 10th discharge capacity (mAh/g) | 295 | 310 |
| 10th charge/discharge efficiency (%) | 100 | 100 |

*[1]Parenthesized value is one determined in terms of boron.

Example 8

A petroleum mesophase pitch having a softening point of 285° C. was charged in an extruder, in which the pitch was melted and deaerated. The resultant melt was introduced under pressure into the same spinning machine as employed in Example 1. The spinning was performed in the same manner as in Example 1, except that 9.3% by weight, relative to the amount of the pitch, boron oxide was fed to the pitch from a feed part of the spinning machine, so that the obtained pitch fibers had a boron content of 3% by weight.

The obtained pitch fiber mat was subjected to the same treatment for infusibilization and light carbonization as in Example 1. The pitch fibers having undergone the light carbonization were graphitized in the same manner as in Example 1, except that milling was not conducted and that the type and amount of boric compound added were changed as specified in Table 3.

The crystal parameters of the obtained carbon material (graphitized mat) were measured by X-ray diffractometry.

This graphitized mat (10 mg) was inserted between a pair of nickel meshes, and the characteristics of charge and discharge capacities thereof were measured in the same manner as in Example 1.

The boron content of the obtained carbon material, the crystal parameter measurement results obtained by X-ray diffractometry and the measurement results with respect to the characteristics of charge and discharge capacities are shown in Table 3.

Example 9

200 g of a petroleum pitch (initial distillate: 460° C., final distillate: 560° C., softening point measured by Mettler softening point meter: 72° C. and number average molecular weight: 400) obtained as a by-product by heat fluid catalytic cracking (FCC) of desulfurized vacuum gas oil was put in a round-bottomed glass flask. Then, 90 g of anhydrous $AlCl_3$ as a Lewis acid catalyst and 1,000 ml of o-dichlorobenzene as a solvent were added thereto and heated at 180° C. for 26 hr while refluxing the solvent to thereby effect a reaction. In this reaction, the molar ratio of pitch/Lewis acid/solvent was 1/1.35/17.65.

After the completion of the reaction, the solvent was distilled off in vacuum in a nitrogen atmosphere, thereby obtaining a solid residue. This solid residue was washed with distilled water and 1N dilute hydrochloric acid to thereby remove the Lewis acid. Thus, a modified pitch (softening point: 176° C.) was obtained.

100 g of this modified pitch was placed in a 500 ml stainless steel reactor and heated at 300° C. while stirring for 30 min under a nitrogen stream.

The thus obtained reaction product was dissolved in trichlorobenzene and filtered. Thus, 62% by weight mesocarbon microbeads were obtained as an insoluble.

Boron carbide was added in an amount of 5% by weight to the thus obtained mesocarbon microbeads, and the resultant microbeads were graphitized in the same manner as in Example 1. Thus, carbon microbeads were obtained.

The crystal parameters of the obtained carbon material (carbon microbeads) were measured by X-ray diffractometry.

A negative electrode and a three-electrode cell having the negative electrode were produced in the same manner as in Example 1, except that use was made of the above carbon microbeads. The characteristics of charge and discharge capacities were measured with the use of this three-electrode cell.

The boron content of the obtained carbon material, the crystal parameter measurement results obtained by X-ray diffractometry and the measurement results with respect to the characteristics of charge and discharge capacities are shown in Table 3.

TABLE 3

| | Ex. 8 | Ex. 9 |
|---|---|---|
| Material to be graphitized | milled carbon fiber | mesocarbon microbeads |
| Graphitization temperature (°C.) | 2,700 | 2,700 |
| Boric compound | boron oxide | boron carbide |
| Amount of boric compd. added*1 (wt. %) | 9.5 (3.9) | 5 (3.9) |
| Boron content of carbon material (ppm) | 18,000 | 20,000 |
| Crystal parameter by X-ray diffractometry | | |
| $d_{002}$ (nm) | 0.3359 | 0.3355 |
| Lc (nm) | 57 | 87 |
| La (nm) | 100 | 100 |
| $P_{101}/P_{100}$ ratio | 1.54 | 1.86 |
| Negative electrode characteristics | | |
| initial discharge capacity (mAh/g) | 335 | 338 |
| initial charge/discharge efficiency (%) | 92 | 88 |
| 10th discharge capacity (mAh/g) | 340 | 335 |
| 10th charge/discharge efficiency (%) | 100 | 100 |

*1 Parenthesized value is one determined in terms of boron.

Comparative Examples 1 to 4

Each carbon material was produced in the same manner as in Example 1 except that no boric compound was added in the graphitization and that the graphitization temperature was changed as specified in Table 4. A negative electrode and a three-electrode cell having the negative electrode were produced with the use of the above carbon material in the same manner as in Example 1. The characteristics of charge and discharge capacities were measured with the use of this three-electrode cell.

The boron content of the obtained milled carbon fibers, the crystal parameter measurement results obtained by X-ray diffractometry and the measurement results with respect to the characteristics of charge and discharge capacities are given in Table 4.

A cyclic Voltamogram of the above three-electrode cell was prepared with respect to the carbon material obtained in Comparative Example 2 in the same manner as in Example 1. The obtained results are shown in FIG. 2.

TABLE 4

| | Comp. Ex. 1 | Comp. Ex. 2 | Comp. Ex. 3 | Comp. Ex. 4 |
|---|---|---|---|---|
| Material to be graphitized | milled carbon fiber | milled carbon fiber | milled carbon fiber | milled carbon fiber |
| Graphitization temp. (°C.) | 2,400 | 2,700 | 2,900 | 3,100 |
| Boric compound | none added | none added | none added | none added |
| Crystal parameter by X-ray diffractometry | | | | |
| $d_{002}$ (nm) | 0.3382 | 0.3371 | 0.3368 | 0.3366 |
| Lc (nm) | 31 | 39 | 40 | 44 |
| La (nm) | 48 | 80 | 82 | 85 |
| $P_{101}/P_{100}$ ratio | 0.72 | 0.94 | 1.09 | 1.12 |
| Negative electrode characteristics | | | | |
| initial discharge capacity (mAh/g) | 258 | 277 | 290 | 300 |
| initial charge/discharge efficiency (%) | 85 | 89 | 90 | 90 |
| 10th discharge capacity (mAh/g) | 250 | 270 | 282 | 288 |
| 10th charge/discharge efficiency (%) | 98 | 100 | 100 | 100 |

Comparative Examples 5 and 6

Each carbon material was produced through graphitization in the same manner as in Example 1 except that, in the graphitization, the amount of added boron carbide was changed as specified in Table 5. A negative electrode and a three-electrode cell having the negative electrode were produced with the use of the above carbon material in the same manner as in Example 1. The characteristics of charge and discharge capacities were measured with the use of this three-electrode cell.

The boron content of the obtained milled carbon fibers, the crystal parameter measurement results obtained by X-ray diffractometry and the measurement results with respect to the characteristics of charge and discharge capacities are shown in Table 5.

TABLE 5

| | Comp. Ex. 5 | Comp. Ex. 6 |
|---|---|---|
| Material to be graphitized | milled carbon fiber | milled carbon fiber |
| Graphitization temperature (°C.) | 2,700 | 2,700 |
| Boric compound | boron carbide | boron carbide |
| Amount of boric compd. added*1 (wt. %) | 0.8 (0.62) | 17 (13.3) |
| Boron content of carbon material (ppm) | 900 | 31,000 |
| Crystal parameter by X-ray diffractometry | | |
| $d_{002}$ (nm) | 0.3371 | 0.3370 |
| Lc (nm) | 40 | 39 |
| La (nm) | 80 | 85 |
| $P_{101}/P_{100}$ ratio | 0.97 | 1.11 |
| Negative electrode characteristics | | |
| initial discharge capacity (mAh/g) | 281 | immeasurable because of mutual binding of milled fibers |
| initial charge/discharge efficiency (%) | 89 | |
| 10th discharge capacity (mAh/g) | 282 | |
| 10th charge/discharge efficiency (%) | 100 | |

*1 Parenthesized value is one determined in terms of boron.

Referring to Table 5, the carbon material of lower boron content produced in Comparative Example 5 had no significant effect of enhancing performance in, for example, charge and discharge capacities, and the carbon material of too large boron content produced in Comparative Example 6 suffered from binding of milled fibers, so that it was unfeasible to fabricate a negative electrode to thereby render the measurement of characteristics of charge and discharge capacities impracticable.

What is claimed is:

1. A process for producing a carbon material for use in a lithium secondary battery, which comprises the steps of:

spinning a mesophase pitch to thereby obtain pitch fibers;

infusibilizing the pitch fibers to thereby obtain infusibilized pitch fibers;

milling the thus infusibilized pitch fibers, and graphitizing the milled fibers at a temperature of not lower than 2,200° C. in the presence of a boric compound.

2. A process for producing a carbon material for use in a lithium secondary battery, which comprises the steps of:

spinning a mesophase pitch to thereby obtain pitch fibers;

infusibilizing the pitch fibers to thereby obtain infusibilized pitch fibers;

subjecting said infusibilized pitch fibers to light carbonization at a temperature of not higher than 1,500° C., milling the thus lightly carbonized pitch fibers, and graphitizing the milled fibers at a temperature of not lower than 2,200° C. in the presence of a boric compound.

3. A carbon material for use in a lithium secondary battery, which is obtained by the process as claimed in claim 1 exhibiting, when subject to X-ray diffractometry, an interplanar spacing of 002 surface ($d_{002}$) of not greater than 0.338 nm and a ratio of diffraction peak (101) to diffraction peak (100), designated as P101/P100, of at least 1.0 and containing boron in an amount ranging from 1,000 ppm to 30,000 ppm.

4. A negative electrode for use in a lithium secondary battery, which comprises the carbon material of claim 3.

5. The carbon material of claim 3, wherein it contains boron in an amount ranging from 5,000 ppm to 30,000 ppm.

6. A lithium secondary battery comprising an electrolyte containing a lithium salt, a positive electrode and a negative electrode comprising the carbon materials defined in claim 3.

* * * * *